(12) United States Patent  (10) Patent No.: US 6,191,517 B1
Radovsky                   (45) Date of Patent: Feb. 20, 2001

(54) BRUSHLESS SYNCHRONOUS ROTARY ELECTRICAL MACHINE

(75) Inventor: Alexander Radovsky, Haifa (IL)

(73) Assignee: S. H. R. Limited BVI, Tel Aviv (IL)

( * ) Notice: Under 35 U.S.C. 154(b), the term of this patent shall be extended for 0 days.

(21) Appl. No.: 09/309,516

(22) Filed: May 10, 1999

Related U.S. Application Data

(63) Continuation-in-part of application No. 08/947,862, filed on Oct. 9, 1997, which is a continuation-in-part of application No. 08/823,671, filed on Mar. 24, 1997, now Pat. No. 5,798,594.

(51) Int. Cl.⁷ .............. H02K 19/00; H02K 21/00
(52) U.S. Cl. ............ 310/162; 310/112; 310/49 R; 310/178; 310/180; 310/164; 310/165; 310/254; 310/261
(58) Field of Search .................. 310/162, 180, 310/178

(56) References Cited

U.S. PATENT DOCUMENTS

| 3,992,641 | * | 11/1976 | Heinrich et al. | 310/168 |
|---|---|---|---|---|
| 4,127,802 | * | 11/1978 | Johnson | 318/696 |
| 4,385,247 | * | 5/1983 | Satomi | 310/49 R |
| 4,496,868 | * | 1/1985 | Advolotkin et al. | 310/112 |
| 5,030,867 | * | 7/1991 | Yamada et al. | 310/156 |
| 5,047,680 | * | 9/1991 | Torok | 310/156 |
| 5,117,144 | * | 5/1992 | Torok | 310/269 |
| 5,334,899 | * | 8/1994 | Skybyk | 310/268 |
| 5,345,131 | * | 9/1994 | Torok | 310/181 |

* cited by examiner

Primary Examiner—Elvin Enad
(74) Attorney, Agent, or Firm—Mark M. Friedman

(57) ABSTRACT

A brushless synchronous electrical machine includes a rotor rotating about a rotor axis, and a stator that includes at least one set of magnetically active stator cores projecting radially outward from the axis, and that also includes magnetically interactive crossbars on the radially outward ends of the stator cores. The rotor includes one or more magnetically active projections that sweep past the radially inward facing surfaces of the crossbars as the rotor rotates. Preferably, there are two sets of stator cores, displaced axially and staggered azimuthally with respect to each other. Stator windings are wound toroidally about the stator cores. The rotor is provided with a magnetic field, preferably by electrical current in one or more axial windings wound toroidally with respect to the rotor axis.

13 Claims, 12 Drawing Sheets

BRUSHLESS SYNCHRONOUS ROTARY ELECTRICAL MACHINE

This is a continuation-in-part of U.S. patent application Ser. No. 08/947,862, filed Oct. 9, 1997, which is a continuation-in-part of U.S. patent application Ser. No. 08/823,671, filed Mar. 24, 1997, now U.S. Pat. No. 5,798,594, issued Aug. 25, 1998.

FIELD AND BACKGROUND OF THE INVENTION

The present invention relates to electrical machinery and, more particularly, to brushless synchronous electrical generators and motors.

FIGS. 1A, 1B and 1C illustrate the terms used herein to define the geometries of rotary machines and their electrical windings. FIG. 1A shows a right circular cylinder 11, and the corresponding radial, azimuthal, and axial directions. As used herein, a "toroidal" winding is a winding, around a cylinder or torus, that is always perpendicular to the axial direction, and a "poloidal" winding is a winding that is at least partly parallel to the axial direction. FIG. 1B shows a torus 12 partially wound with a toroidal winding 13. FIG. 1C shows a torus 14 partially wound with a poloidal winding 15.

In a conventional synchronous AC electric generator, the rotor winding is connected to a DC current source via rings and brushes. As the rotor is rotated, the magnetic field created by the DC current rotates along with the rotor, inducing an AC electromagnetic force (EMF) in the stator winding. The same design is commonly used for synchronous electric motors: AC current in the stator winding creates a rotating magnetic field that interacts with the rotor's direct magnetic field, causing the rotor armature to rotate.

This design suffers from several inefficiencies. First, the rings and the brushes wear out over time and must be replaced. Second, parts of the stator winding, called "winding ends", protrude beyond the armature. These winding ends do not participate in the generation of electrical current in a generator, or in the generation of torque in a motor; but, unless the windings are made of superconductors, the winding ends contribute to resistance losses. In addition, the associated magnetic fields create eddy currents in electrical conductors outside of the armatures. These eddy currents are an additional drain on the power output of a generator or the power input of a motor.

The reason that rings and brushes are needed in the conventional synchronous machine design is to provide electrical power from a stationary DC current source to a moving rotor winding. There also are brushless designs, one of which, a synchronous induction machine, is illustrated schematically in cross-section in FIG. 2. An axially slotted cylinder 32, made of a ferromagnetic material such as iron, is rigidly mounted on a shaft 30, and rotates within a stationary armature 34. Armature 34 is geometrically in the form of an annulus, with a cylindrical central hole to accommodate slotted cylinder 32, and an interior equatorial slot to accommodate an annular, toroidally wound coil 36. In cross section, armature 34 looks like two opposed U's, as shown. What appear as the arms of the U's are actually two toroidal disks. A set 38 of windings are wound poloidally in slots on the inner periphery of these two disks. Conventionally there are three interleaved windings in set 38, making the synchronous induction machine of FIG. 2 a three-phase machine.

A DC current is supplied to toroidal coil 36, creating a magnetic field around slotted cylinder 32 and windings 38. Because cylinder 32 is slotted and ferromagnetic, as cylinder 32 rotates, the geometry of the magnetic field changes, inducing an AC EMF in poloidal windings 38. Conversely, an AC current introduced to poloidal windings 38 generates a time-varying magnetic field that applies a torque to cylinder 32, causing cylinder 32 to rotate.

The design of FIG. 2 eliminates the need for rings and brushes, but still has the inefficiencies associated with having winding ends that protrude outside the effective zone of electromagnetic induction. In addition, this design is inherently wasteful of space. Coils 36 and 38 must be separated spatially (as shown schematically in FIG. 2) to minimize eddy current losses.

There thus is a widely recognized need for, and it would be highly advantageous to have, an electrical machine (generator or motor) with only stationary windings, arranged geometrically for maximum efficiency.

SUMMARY OF THE INVENTION

According to the present invention there is provided an electrical machine including: (a) a rotor, free to rotate about a rotor axis and including a first magnetically interactive projection extending radially outward from the rotor axis; and (b) a stator including: (i) a first plurality of magnetically interactive stator cores extending radially outward from a first common center located on the rotor axis, and (ii) a structure for magnetically linking the first projection of the rotor to a radially outward end of each of the stator cores as the first projection sweeps past each the stator core as the rotor rotates.

According to the present invention there is provided an electrical machine including: (a) a rotor, free to rotate about a rotor axis and including a first magnetically interactive projection extending radially outward from the rotor axis; and (b) a stator including: (i) a first plurality of magnetically interactive stator cores extending radially outward from a first common center located on the rotor axis, and (ii) a second plurality of magnetically interactive stator cores, like in number to the stator cores of the first plurality and extending radially outward from a common center located on the rotor axis and different from the first common center; the common centers defining a stator axis coincident with the rotor axis, the stator cores of the first plurality being positioned azimuthally around the stator axis at substantially equal angular separations, the stator cores of the second plurality being positioned azimuthally around the stator axis at substantially equal angular separations, the stator cores of the second plurality being displaced azimuthally with respect to the stator cores of the first plurality.

As used herein, the term "magnetically interactive material" means a material that interacts strongly with a magnetic field, for example a ferromagnetic material or a ferrimagnetic material. Parts of the present invention that are made of, or include, a magnetically interactive material are herein called "magnetically interactive". The preferred magnetically interactive materials of the present invention are soft ferromagnetic materials such as magnetic steel, and magnetically interactive insulators, such as ferrite. If electrically conductive materials such as magnetic steel are used, the parts constructed thereof preferably are constructed so as to suppress energy-wasting eddy currents. For example, these parts may be laminated of alternating layers of magnetic steel and an insulator.

The present invention is similar to the synchronous induction machine of FIG. 2, but the windings and armatures are arranged so that all, or almost all, of the length of the windings actively participate in the energy transformation process. The present invention is based on a stator armature that includes at least one set of magnetically interactive stator cores projecting radially away from a common center. A stator winding is wound toroidally around each stator core. A rotor rotates about an axially directed rotor axis that runs through the common center. Rigidly attached to the radially outward end of each stator core is a magnetically active crossbar that runs parallel to the rotor axis. The rotor includes at least one magnetically interactive projection, a radially outward surface of which sweeps past radially inward surfaces of the crossbars as the rotor rotates, thereby linking the projection magnetically to the radially outward ends of the stator cores.

Preferably, the rotor includes two such projections, with the stator cores axially between the two projections.

A mechanism is provided for generating a magnetic field in the rotor. In one preferred embodiment of the present invention, this mechanism includes one or more toroidal windings concentric with the rotor axis. In another preferred embodiment of the present invention, this mechanism includes permanent magnets in the rotor projections. The radial extent of the rotor projections varies azimuthally, so that the geometry of the magnetic field around the rotor changes as the rotor rotates, or, conversely, a time-varying magnetic field near the rotor exerts a torque on the rotor projections.

In one preferred embodiment of the present invention, the rotor includes a magnetically interactive shaft, coaxial with the rotor axis, that connects the rotor projections and through which the magnetic flux loops from the rotor projections to the stator cores are closed. Most preferably, this rotor shaft is constructed so as to suppress eddy currents. In another preferred embodiment of the present invention, the stator armature includes a hollow, magnetically interactive hub, concentric with the rotor axis, to which the stator cores are rigidly attached and from which the stator cores project radially. In this embodiment, the rotor shaft, which runs axially through the stator hub, need not be magnetically interactive, as the magnetic flux loops from the rotor projections to the stator cores are closed through the stator hub. Most preferably, in this embodiment, radially inward surfaces of the rotor projections sweep past a radially outward surface of the hub as the rotor rotates.

In one preferred construction of the latter embodiment, the stator armature is made of H-shaped members having axially directed legs and radially directed crosspieces. The radially inward legs are approximate segments of the hub. The radially outward legs are the crossbars. The crosspieces, which are directed radially, are the stator cores.

Preferably, there are two sets of magnetically interactive stator cores, each set projecting radially outward from a separate common center that lies on the rotor axis. The two common centers define a stator axis that is coincident with the rotor axis. The stator cores of each set are spaced at equal azimuthal spacings around the stator axis, and the two sets are staggered azimuthally with respect to each other.

Thus, the present invention succeeds in providing a compact, efficient brushless electrical machine whose windings are fully exploited. The principle of the present invention actually was partially disclosed over 100 years ago, by Mordey, in U.S. Pat. No. 437,501. Mordey's electrical generator includes an optionally stationary toroidal inner winding, within which rotates a rotor that includes two projections that sweep past the inner winding, and a toroidal stator winding surrounding and concentric with the inner winding. This idea was not pursued in practice, and was superseded by the generator designs described above, presumably because Mordey's design is a one-phase design, in which, when used as a generator, energy-wasting secondary AC currents are induced in the excitation winding.

The problems addressed herein also have been addressed by Török in U.S. Pat. No. 5,047,680. Török's solution, however, requires the use of permanent magnets, and therefore is inherently limited to low power applications. In addition, Török's permanent magnets are mounted on his stator as circumferential rings that are mutually staggered, whereas his toothed rotor rings, which rotate within the rings of permanent magnets, are mutually aligned, so that when one rotor ring is aligned with the surrounding ring of permanent magnets, thereby being in a position of low reluctance, the other rotor rings are staggered with respect to the rings of permanent magnets that surround them, and are therefore in positions of high reluctance. This reduces the efficiency of Török's design.

A further advantage of the electrical machine of the present invention over the machine of the prior art is that the stator windings of the present invention require less insulation than the stator windings of the prior art. In a conventional synchronous AC generator, for example, the stator winding is inserted into slots in the stator armature, and must be insulated on all sides from the voltage difference (whatever the output of the generator is) between the winding and the armature. Stator windings of the present invention are wound helically, on the surfaces of the stator armatures, and so must be insulated from the output voltage difference of the generator only on the sides that face the stator armatures. The insulation between lengths of stator winding needs to withstand a much smaller voltage difference, and so may be much thinner than the insulation between the windings and the armature.

Electric machines similar to the present invention are taught in U.S. Pat. No. 5,798,594 and in co-pending U.S. Pat. No. 5,952,759. These electrical machines also have a stator armature that has stator cores projecting radially outward from a central axis, axial windings coaxial with the central axis, and a rotor, coaxial with the central axis, from which project two projections that sweep past the windings as the rotor rotates. There are three improvements in the present invention over the prior art electrical machines of U.S. Pat. No. 5,952,759 and U.S. patent application Ser. No. 08/947,862. The first improvement is that the gap between the rotor projections and the part of the stator to which these projections is linked magnetically is an axial gap in the prior art electrical machines and a radial gap in the present invention. This gives the present invention enhanced mechanical stability relative to the prior art electrical machines. The second improvement is that the two sets of stator cores of the present invention are displaced axially and azimuthally with respect to each other. This displacement allows the use of larger stator windings than in the prior art electrical machines. The third improvement is that the paths of the magnetic flux lines are shorter in the present invention than in the prior art electrical machines.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a brushless synchronous rotary electrical machine in which the armature and winding geometries are selected to maximize the interaction of the magnetic fields created by the windings. The present invention can be used to generate AC power, or to convert AC power to rotary motion, more efficiently than presently known electrical machines.

The principles and operation of an electrical machine according to the present invention may be better understood with reference to the drawings and the accompanying description.

Figure 1A:
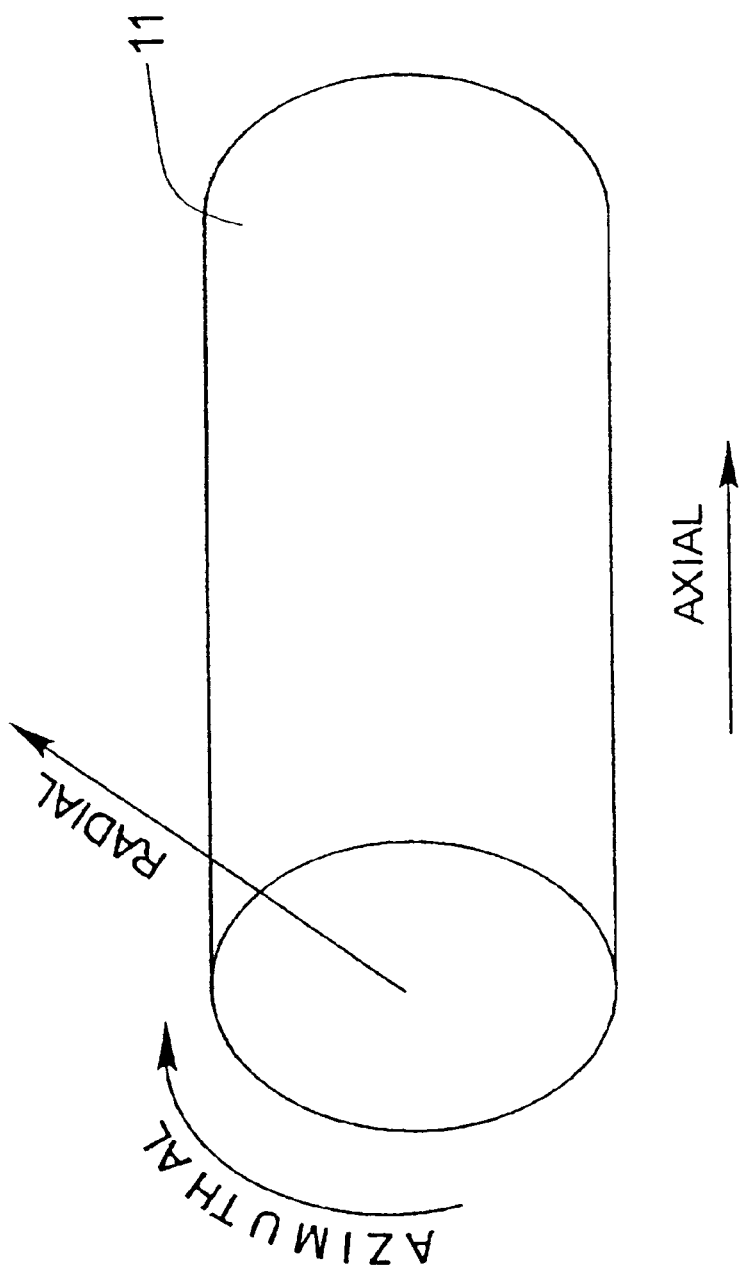
FIG. 1A (prior art) illustrates the definition of geometric terms used herein.
Figure 1B:
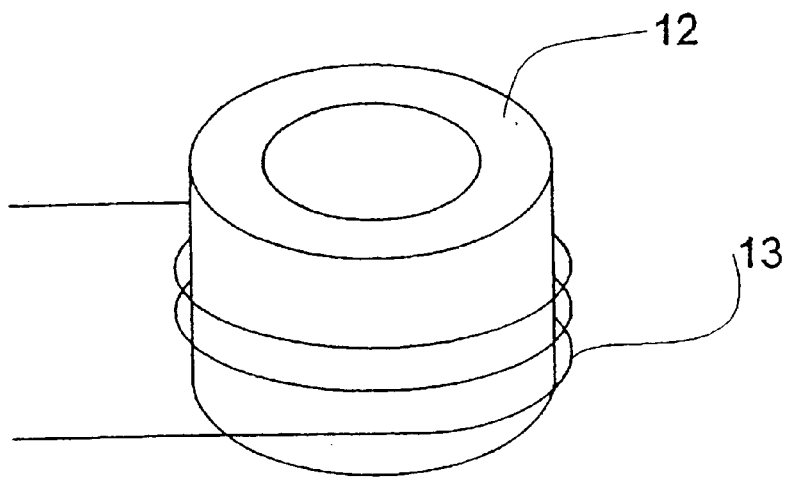
FIG. 1B (prior art) illustrates the definition of the term "toroidal" as used herein.
Figure 1C:
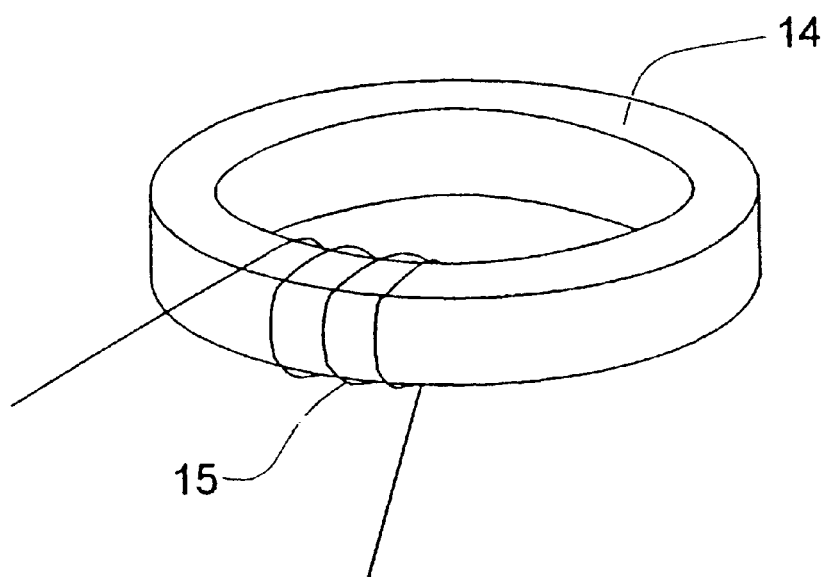
FIG. 1C (prior art) illustrates the definition of the term "poloidal" as used herein.
Figure 2:
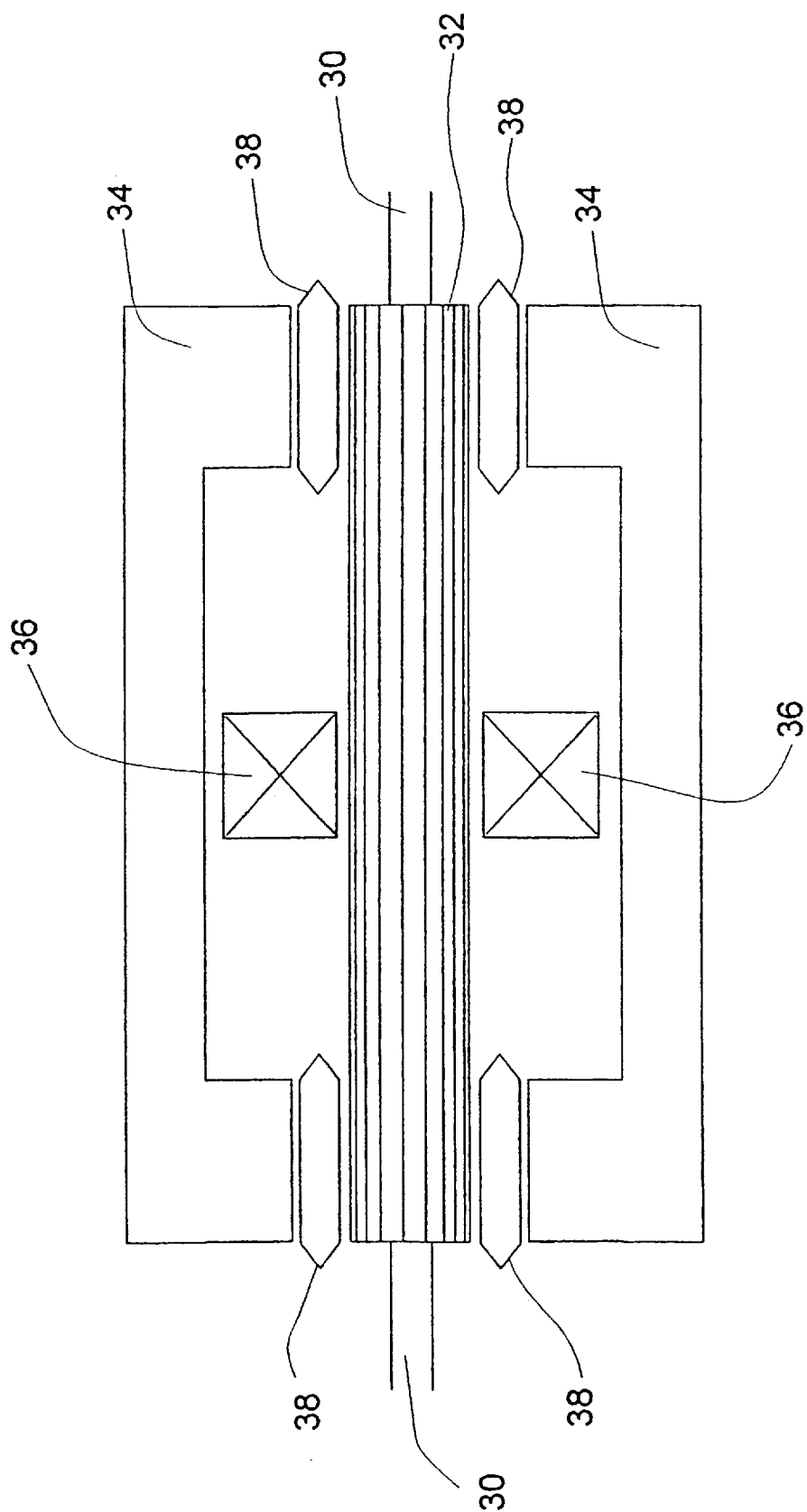
FIG. 2 (prior art) is a schematic cross-section of a synchronous induction machine.
Figure 3:
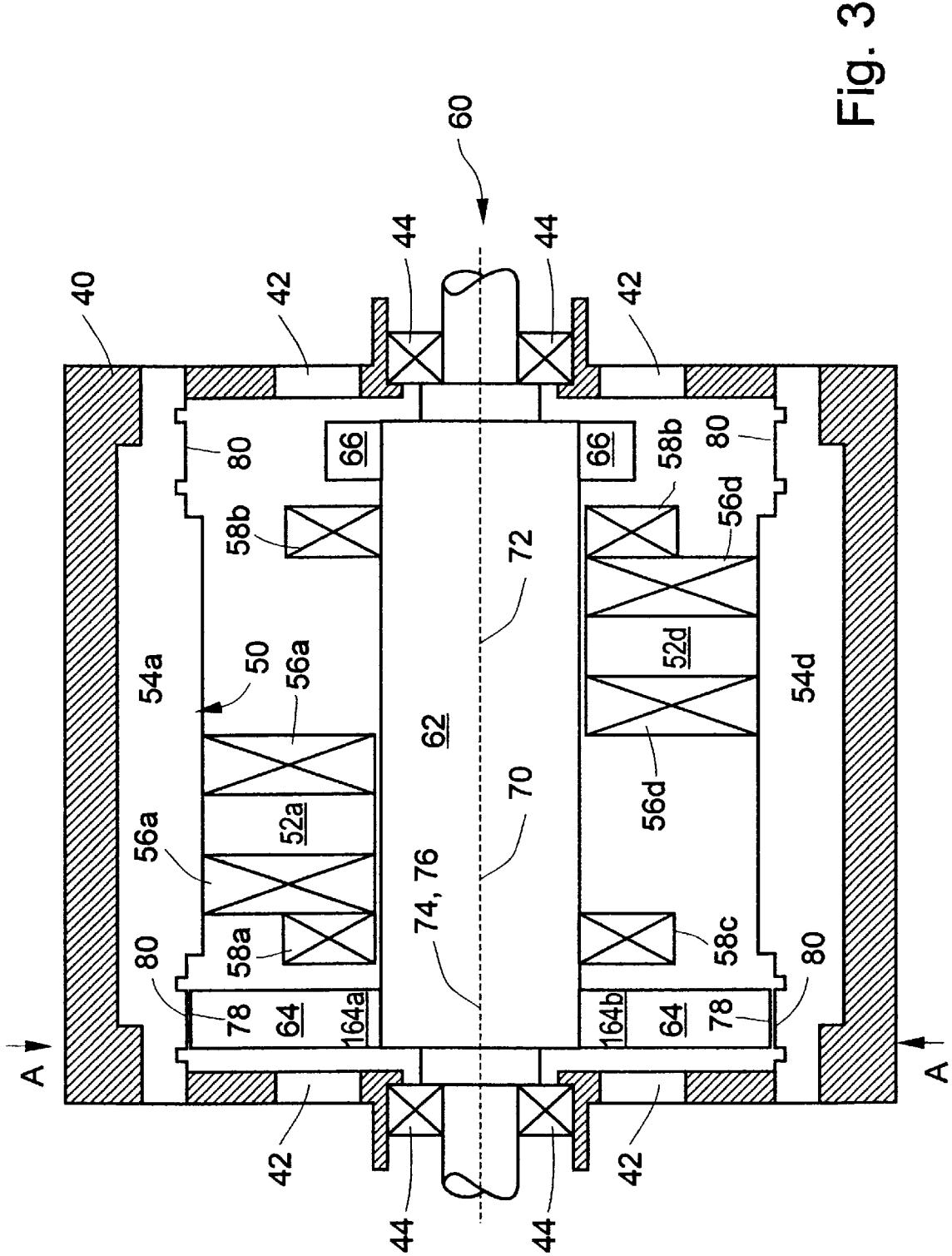
FIG. 3 is an axial cross-section of a first embodiment of an electrical machine of the present invention.
Figure 4:
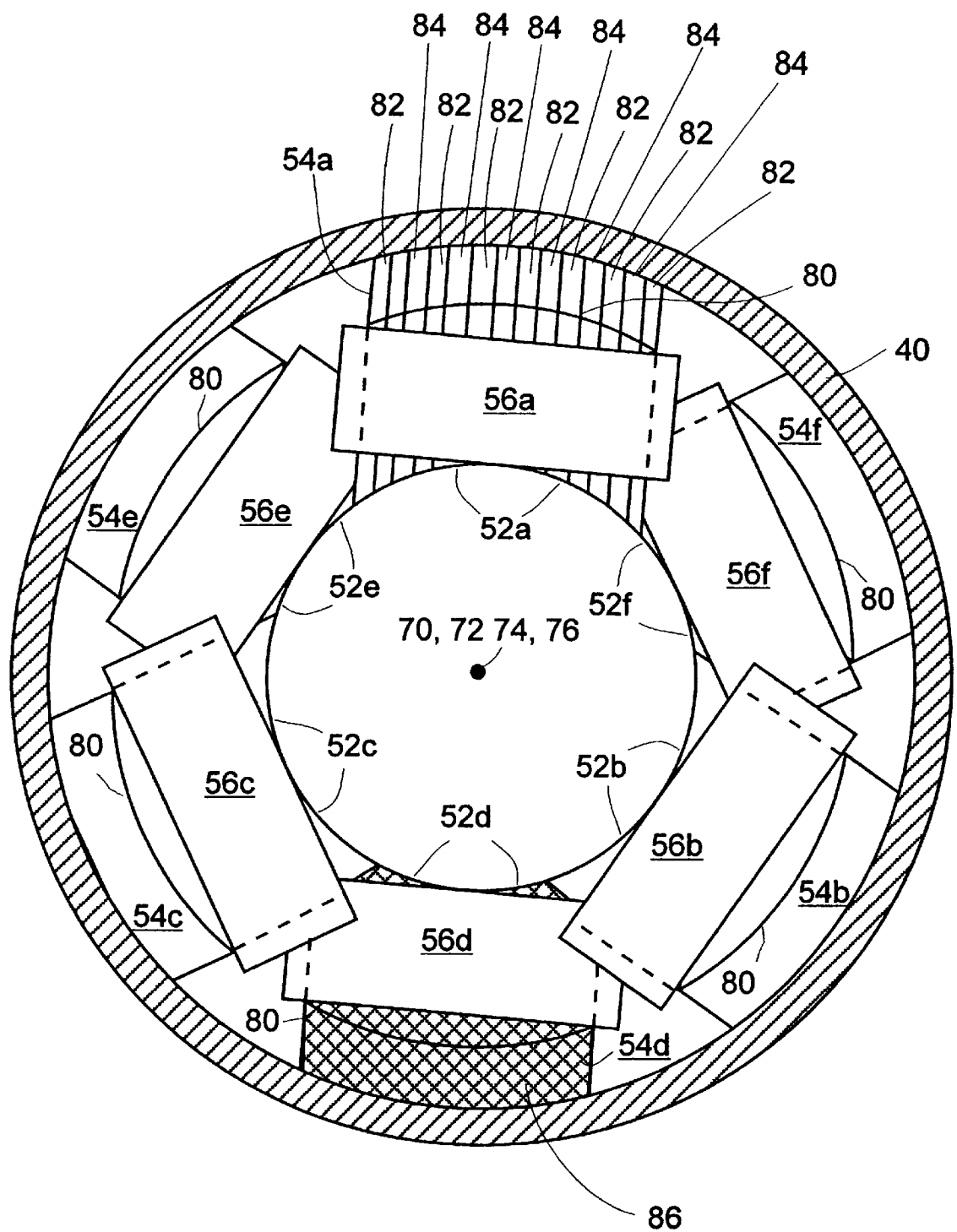
FIG. 4 is a partial end view of the electrical machine of FIG. 3 at a transverse cut.
Figure 5:
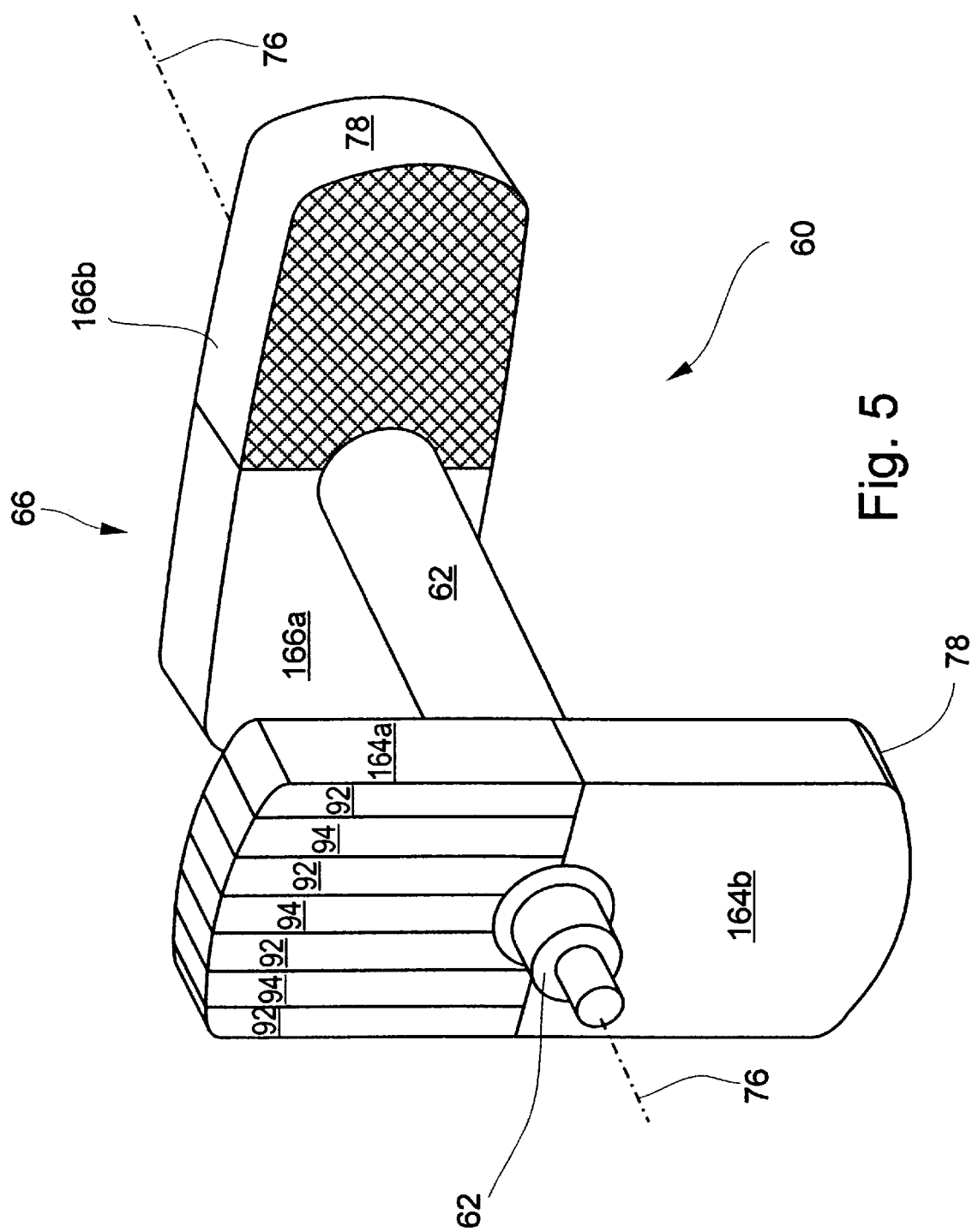
FIG. 5 is a perspective view of the rotor of the electrical machine of FIG. 3.

Referring now to the drawings, FIG. 3 is an axial cross-sectional view of a first embodiment of an electrical machine of the present invention; FIG. 4 is a partial end view of the electrical machine of FIG. 3 at a transverse cut, and FIG. 5 is a perspective view of the rotor of the electrical machine of FIG. 3. The transverse cut of FIG. 4 is at section A—A of FIG. 3.

The embodiment of FIGS. 3–5 includes a stator, mounted in a housing 40, and a rotor 60. The stator includes a magnetically interactive stator armature 50 and several windings 56 and 58. Rotor 60 includes a shaft 62 in the shape of a stepped cylinder and two projections 64 and 66 projecting radially outward from shaft 62 on opposite axial sides of shaft 62. Shaft 62 is rotatably mounted in bearings 44 in housing 40. Apertures 42 in housing 40 allow air to enter housing 40 for cooling. FIG. 4 is an end view of the electrical machine of FIG. 3, from the left as seen in FIG. 3, cut transversely at cut A—A as shown in FIG. 3, and with rotor 60 and windings 58 removed.

Stator armature 50 includes six stator cores 52 with corresponding crossbars 54. There are two sets of stator cores 52. The first set includes three stator cores 52a, 52b and 52c extending radially outward from a common center 70, or, equivalently, extending radially inward from housing 40 towards common center 70. The second set includes three stator cores 52d, 52e and 52f extending radially outward from another common center 72, or, equivalently, extending radially inward from housing 40 towards a common center 72. Common centers 70 and 72 define a stator axis 74. Rotor 60 is mounted in bearings 44 to rotate about a rotor axis 76 that is coincident with stator axis 74. The inward-facing ends of stator cores 52 are curved, as shown in FIG. 4, to accommodate shaft 62, with a small air gap between cores 52 and shaft 62.

Also as shown in FIG. 4, stator cores 52a, 52b and 52c are mounted at equal azimuthal spacings around stator axis 74. Similarly, stator cores 52d, 52e and 52f are mounted at equal azimuthal spacings around stator axis 74. Stator cores 52d, 52e and 52f also are displaced azimuthally relative to stator cores 52a 52b and 52c: taking "straight up" in FIG. 4 to be 0° with azimuthal displacement increasing counterclockwise, stator core 52a is at 0°, stator core 52b is at 120°, stator core 52c is at 240°, stator core 52d is at 180°, stator core 52e is at 300°, and stator core 52f is at 60°.

Radially beyond and rigidly attached to stator cores 52 are corresponding magnetically interactive crossbars 54 whose long dimensions are parallel to stator axis 74. Crossbars 54 are in turn rigidly secured to housing 40, so that stator cores 52 are mounted within housing 40 by virtue of their rigid attachment to crossbars 54.

Wound toroidally around each stator core 52 is a corresponding stator winding 56. Axially adjacent to each set of stator cores 52 is a toroidally wound axial winding 58 that is concentric with stator axis 74: axial winding 58a to the left of stator cores 52a, 52b and 52c as seen in FIG. 3, and axial winding 58b to the right of stator cores 52d, 52e and 52f as seen in FIG. 3.

As is best seen in FIG. 5, the peripheral portion of rotor 60 consists of two mutually perpendicular projections 64 and 66, one at either end of shaft 62 and both perpendicular to rotor axis 76. Projection 64 includes two lobes 164a and 164b directed in mutually opposite radial directions from shaft 62. Similarly, projection 66 includes two lobes 166a and 166b directed in mutually opposite directions from shaft 62. As rotor 60 rotates, projection 64 sweeps past stator windings 56a, 56b and 56c and past axial winding 58a, and projection 66 sweeps past stator windings 56d, 56e and 56f and past axial winding 58b. Radially outward surfaces 78 of projections 64 and 66 are cylindrical surfaces that are coaxial with rotor axis 76. To accommodate the motion of projections 64 and 66 therepast, crossbars 54 are provided with radially inward concave cylindrical surfaces 80. As is known in the art, the curvature of surfaces 80 is chosen so that the output voltage of the electrical machine, when used as a generator, is approximately a sinusoidal function of time.

Most preferably, stator cores 52, crossbars 54, shaft 62 and projections 64 and 66 are constructed to suppress power-wasting eddy currents. Several construction methods for accomplishing this end are illustrated in FIGS. 4–6.

In FIG. 4, stator core 52a and crossbar 54a are shown as collectively a laminated structure made of parallel sheets 82 of a magnetically interactive metal such as magnetic steel, separated by layers 84 of an insulator such as epoxy glue. Stator core 52d and crossbar 54d are shown made of sintered ferrite particles, represented by cross-hatching 86. In FIG. 5, lobe 164a is shown as a laminated structure made of parallel sheets 92 of a magnetically interactive metal such as magnetic steel, separated by layers 94 of an insulator such as epoxy glue. Sheets 92 and 94 may be parallel to axis 76 as shown, or may be perpendicular to axis 76. Lobe 166b is shown as made of sintered ferrite particles, represented by cross-hatching 96.

Figure 6A:
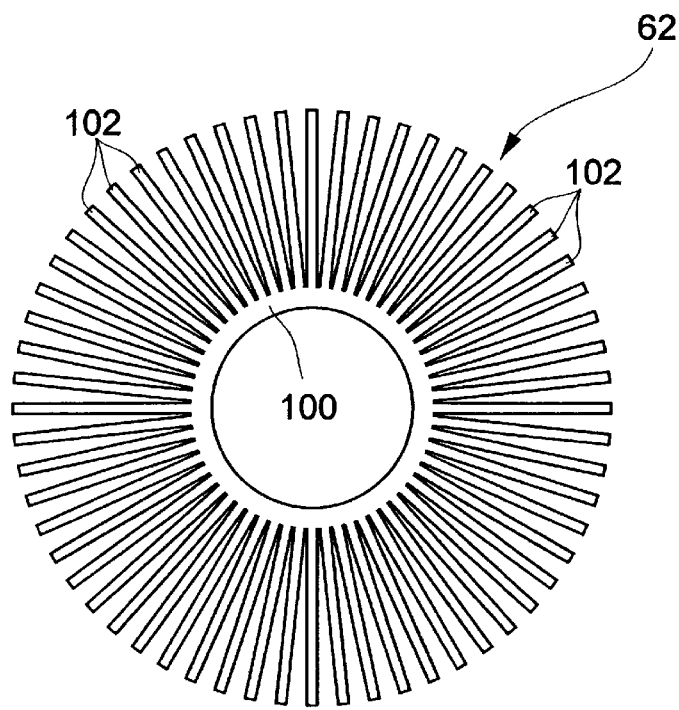
FIGS. 6A, 6B and 6C are transverse cross-sections of three variants of the rotor shaft of FIG. 5.
Figure 6B:
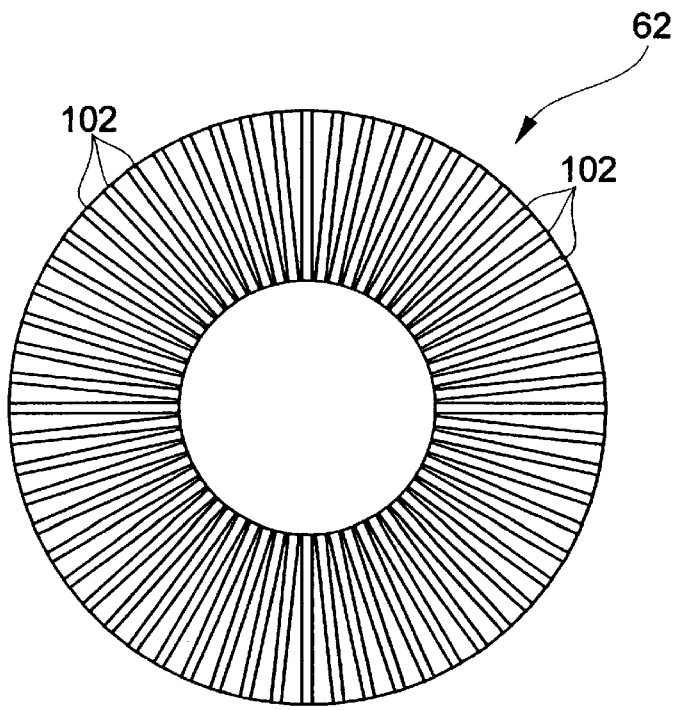

FIG. 6A is a transverse cross-section of one variant of shaft 62, made of a magnetically interactive metal such as magnetic steel, and shaped to suppress eddy currents. This variant of shaft 62 is in the form of an inner cylinder 100 from which project radially a multitude of vanes 102. FIG. 6B is a transverse cross-section of a second variant of shaft 62, in which a multitude of elongated wedges 104, made of a magnetically interactive metal such as magnetic steel, are embedded in a matrix of an insulator 106 such as epoxy glue. Functionally, the difference between these two embodiments is that in the embodiment of FIG. 6A vanes 102 are separated by a gaseous insulator (air) whereas in the embodiment of FIG. 6B wedges 104 are separated by solid insulator 106.

Figure 6C:
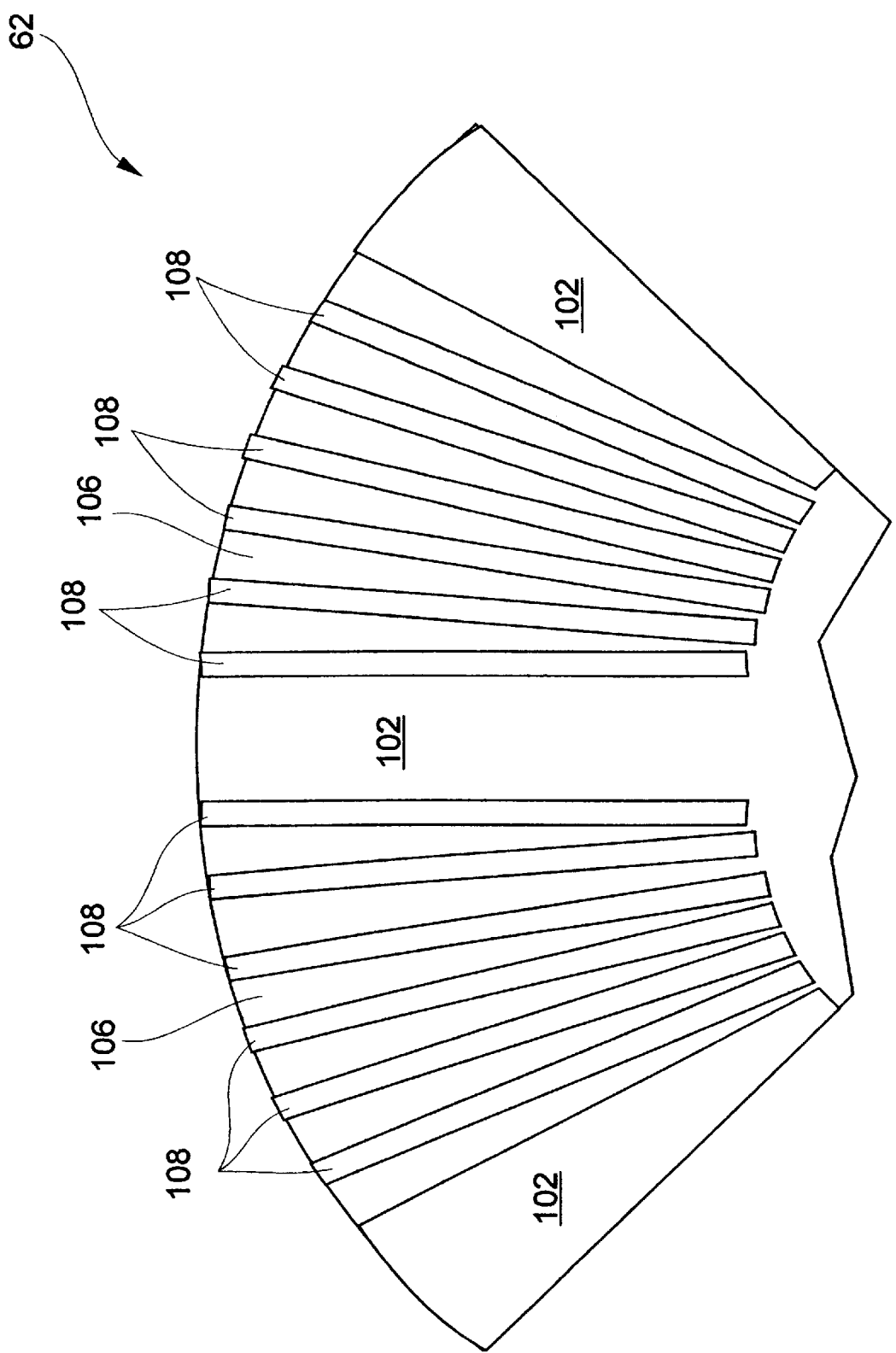

FIG. 6C is an enlarged partial transverse cross-section of a third variant of shaft 62. The variant of FIG. 6C is similar to the variant of FIG. 6A, but the gaps between vanes 102 are occupied, not by air, but by packets of laminated insulated strips (shims) 108 made of a magnetically interactive material such as magnetic steel. Shims 108 are covered by an insulator 106 such as epoxy glue.

Of course, the eddy-current-suppressing design illustrated in FIG. 4 for stator core 52d and crossbar 54d and in FIG. 5 for lobe 166b, i.e., the use of a magnetically active insulator for these components, also is applicable to shaft 62.

To use the electrical machine of FIGS. 3–5 as a three-phase generator, DC current is supplied to axial windings 58 and rotor 60 is rotated. Magnetically interactive stator cores 52 and crossbars 54 divert the magnetic field created by the DC current through stator windings 56. As magnetically interactive projections 64 and 66 sweep past stator windings 56, the direction in which the magnetic field is directed through stator cores 52 changes periodically, inducing AC EMFs in stator windings 56.

Suppose for definiteness that the DC current in axial windings 58 flows into the plane of FIG. 3 above shaft 62 and out of the plane of FIG. 3 below shaft 62, i.e., counterclockwise in FIG. 4. The magnetic flux through axial windings 58 is always directed to the left in FIG. 3. As a result, the radially outward ends of lobes 164 always are north magnetic poles and the radially outward ends of lobes 166 always are south magnetic poles. With rotor 60 oriented relative to stator cores 52 as shown in FIG. 3, magnetic flux branches up from shaft 62 into lobe 164a and down from shaft 62 into lobe 164b. The upper branch of the magnetic flux enters the left side of crossbar 54a via the air gap between surface 78 of lobe 164a and surface 80 of crossbar 54a, crosses rightward as seen in FIG. 3 to stator core 52a, descends through stator core 52a, and enters shaft 62 via the air gap between stator core 52a and shaft 62. The lower branch of the magnetic flux enters the left side of crossbar 54d via the air gap between surface 78 of lobe 164b and surface 80 of crossbar 54d, crosses rightward as seen in FIG. 3 to stator core 52d, ascends through stator core 52d, and enters shaft 62 via the air gap between stator core 52d and shaft 62.

The magnetic flux in shaft 62 also splits into four other branches, radially outward across the air gap between shaft 62 and stator cores 52b, 52c, 52e and 52f and then radially outward through stator cores 52b, 52c, 52e and 52f. The two branches through stator cores 52b and 52f cross rightward as seen in FIG. 3 in crossbars 54b and 54f to merge in lobe 166b via the air gap between surfaces 80 of crossbars 54b and 54f and surface 78 of lobe 166b and proceed radially inward in lobe 166b. The two branches through stator cores 52c and 52e cross rightward as seen in FIG. 3 in crossbars 54c and 54e to merge in lobe 166a via the air gap between surfaces 80 of crossbars 54c and 54e and surface 78 of lobe 166a and proceed radially inward in lobe 166a. The inwardly directed magnetic fluxes in lobes 166a and 166b merge into shaft 62. As a result, the magnetic flux is directed radially inward through stator windings 56a and 56d at its maximum value and radially outward through stator windings 56b, 56c, 56e and 56f at half its maximum value.

Now rotate rotor 60 clockwise by 30° with respect to FIG. 4. Lobe 164a now is halfway between crossbars 54a and 54f, lobe 164b is halfway between crossbars 54c and 54d, lobe 166a is adjacent to crossbar 54e and lobe 166b is adjacent to crossbar 54b. Therefore, the magnetic flux through stator windings 56a, 56c, 56d and 56f is directed radially inward, at half its maximum value, and the magnetic flux through stator windings 56b and 56e is directed radially outward at its maximum value. Rotating rotor 60 clockwise by another 30° brings lobe 164a adjacent to crossbar 54f, lobe 164b adjacent to crossbar 54c, lobe 166a halfway between crossbars 54a and 54e, and lobe 166b halfway between crossbars 54b and 54d. Now, the magnetic flux through stator windings 56c and 56f is directed radially inward at its maximum value, and the magnetic flux through stator windings 56a, 56b, 56d and 56e is directed radially outward at half its maximum value. Thus, as rotor 60 is rotated at a uniform angular speed, AC EMFs are induced in stator windings 56 that are identical except for being shifted in phase relative to each other by one-third of a cycle.

The specific embodiment of the present invention that is illustrated in FIGS. 3–5 is a four-lobe, six-pole machine. In general, the rotor projections of the present invention may have any number of magnetically active lobes, with the lobes of each projection spaced azimuthally at equal angular increments and with the lobes of one projection interleaved azimuthally with respect to the lobes of the other projection. Correspondingly, in the embodiments of the present invention that are configured as three-phase machines, the stator armature includes three times as many stator cores and crossbars as there are lobes in either of the projections, i.e., one and one-half times the total number of rotor lobes. Equivalently, each set of stator cores includes one and one-half times as many stator cores as there are lobes in either of the projections. In other embodiments within the scope of the present invention, configured as one-phase machines, the stator armature includes as many stator cores as there are lobes in either of the projections.

In the case of rotor projections that have odd numbers of lobes, the angular interleaving means that the lobes of one projection extend radially away from the shaft in a manner opposite to the lobes of the other projection.

Figure 7:
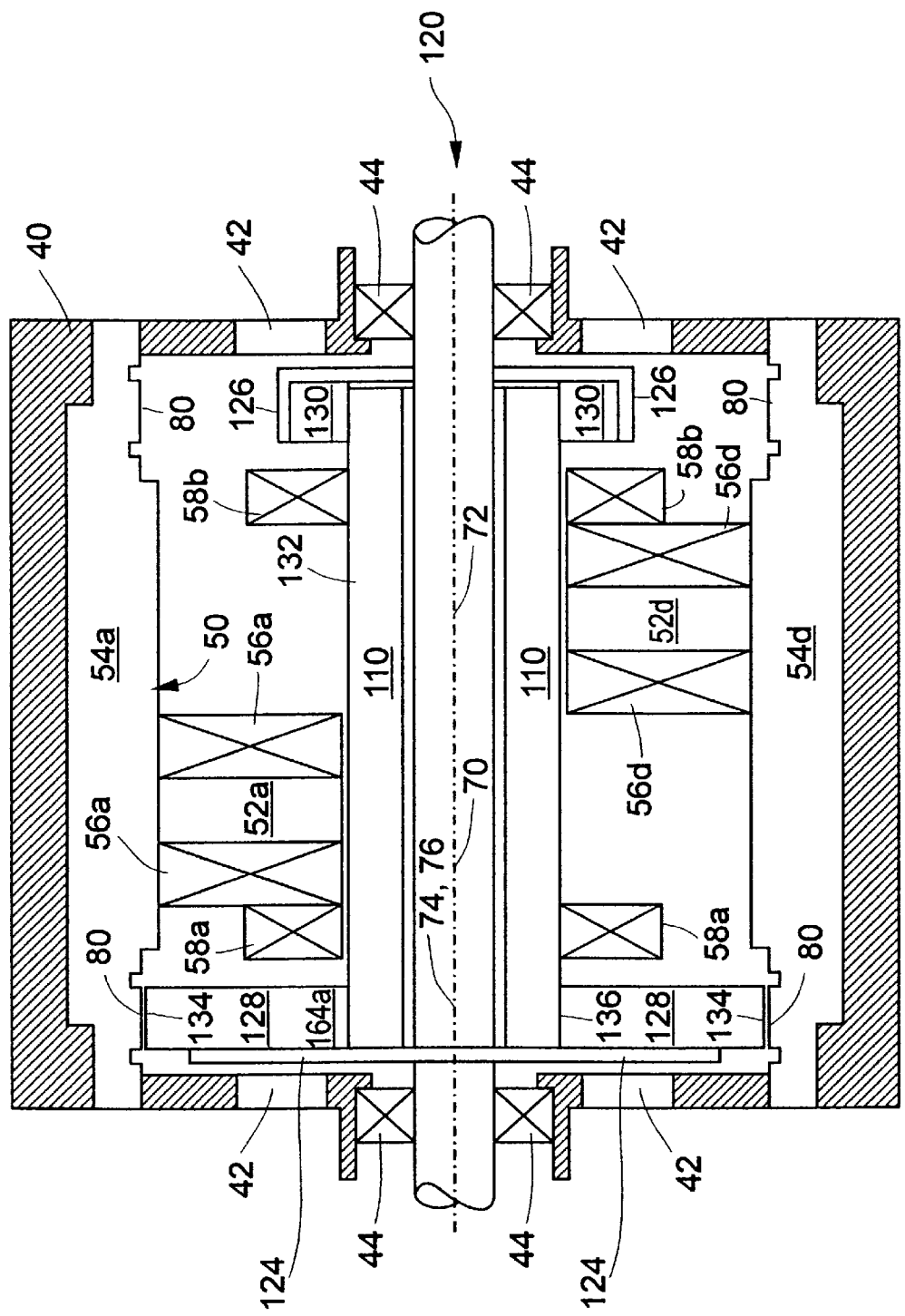
FIG. 7 is an axial cross-section of a second embodiment of an electrical machine of the present invention.

FIG. 7 is an axial cross-sectional view of a second embodiment of an electrical machine of the present invention. The embodiment of FIG. 7 is similar to the embodiment of FIG. 3, so that like reference numerals refer to like parts. There are two differences between the embodiment of FIG. 7 and the embodiment of FIG. 3.

The first difference is that stator cores 52 are rigidly attached, at the radially inward ends thereof, to a hollow cylindrical hub 110 made of a magnetically interactive material. The rotational symmetry axis of hub 110 coincides with stator ax is 74. Hub 110 provides stator armature 50 with enhanced mechanical stability, relative to the embodiment of FIG. 3.

The second difference is that rotor 60 is replaced with a rotor 120 that includes a shaft 122 from which project brackets 124 and 126 in the same way that projections 64 and 66 project from shaft 62 of rotor 60: brackets 124 and 126 project radially outward from shaft 122, and bracket 124 is oriented perpendicularly to bracket 126. Shaft 124 is rotatably mounted in bearings 44 to rotate about a rotor axis 176 that is coincident with stator axis 74. Bracket 124 holds two magnetically active members 128. Bracket 126 holds two magnetically active members 130. Members 128 extend in mutually opposite radial directions from shaft 122, just as lobes 164 extend in mutually opposite radial directions from shaft 62. Similarly, members 130 extend in mutually opposite radial directions from shaft 122, just as lobes 166 extend in mutually opposite radial directions from shaft 62.

Note that in this embodiment of the present invention it is not necessary for shaft 122 and brackets 124 and 126 to be made of magnetically interactive materials. The methods described above for suppressing eddy currents in shaft 62 also are applicable to hub 110.

Figure 8:
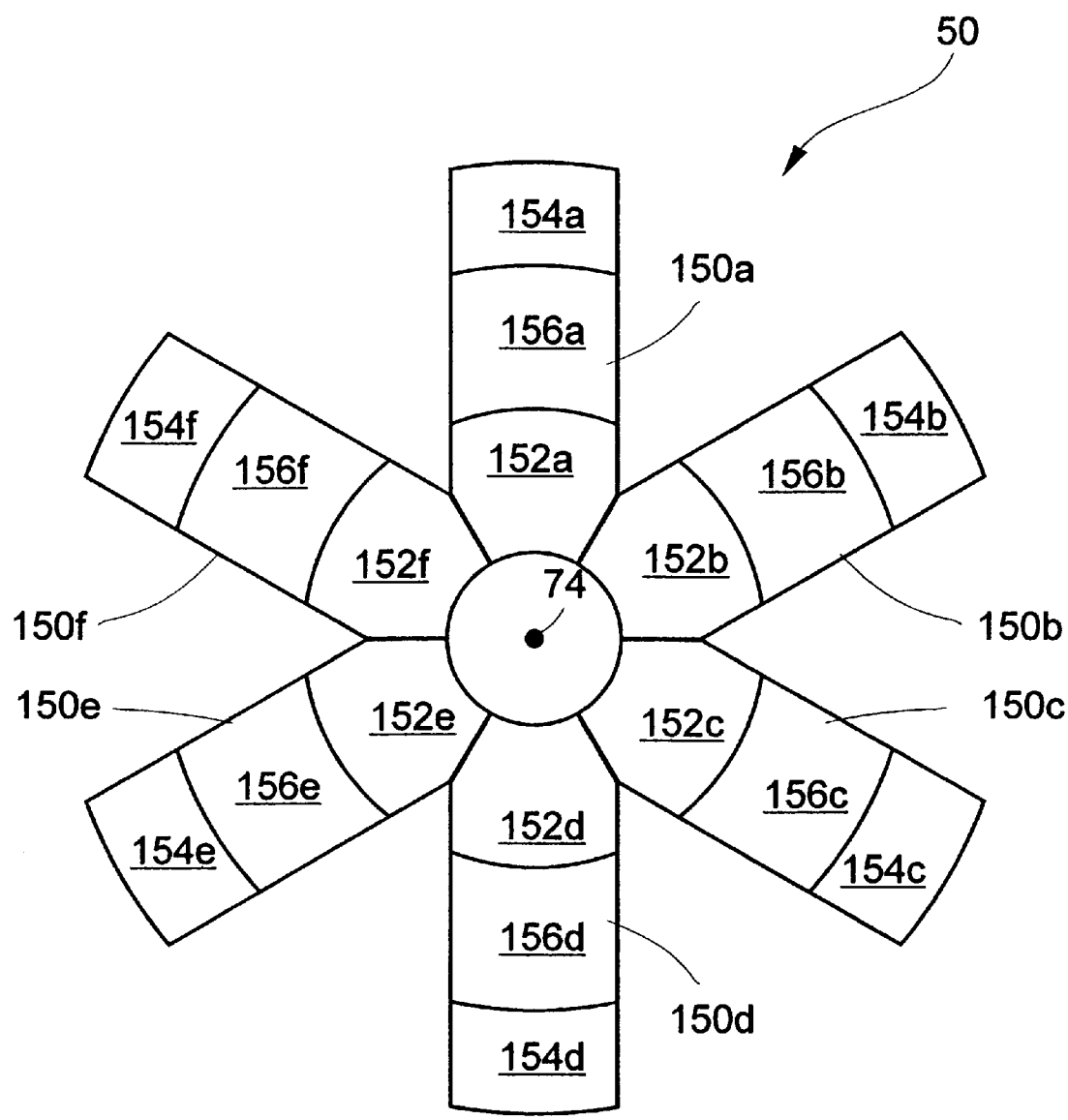
FIG. 8 is an end view of one preferred embodiment of the stator armature of the electrical machine of FIG. 7.
Figure 9:
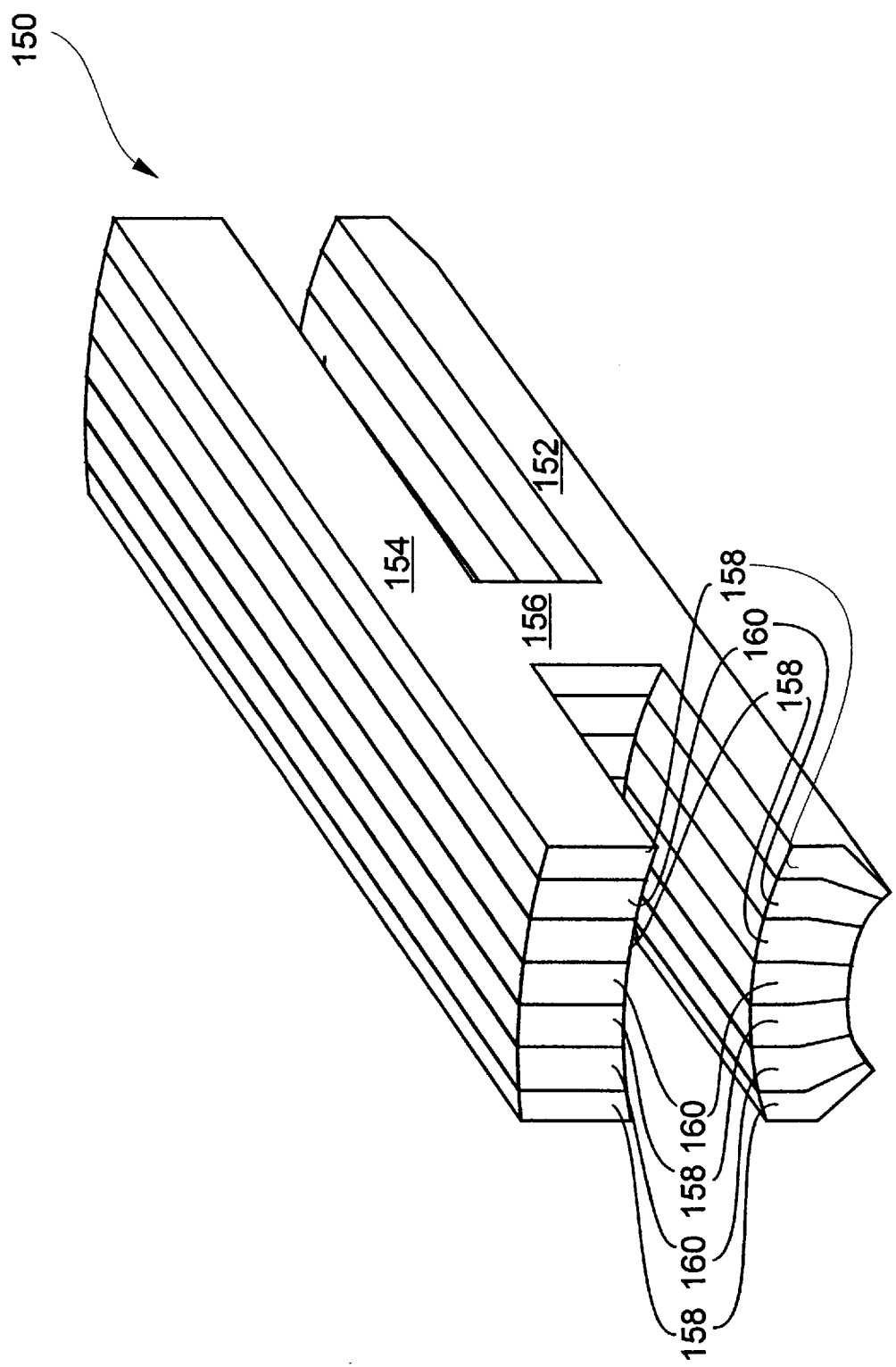
FIG. 9 is a perspective view of one H-piece of the stator armature of FIG. 8.

FIG. 8 is an end view of one preferred embodiment of stator armature 50 of the electrical machine of FIG. 7. Stator armature 50 of FIG. 8 is made of six Hpi pieces 150. FIG. 9 is a perspective view of one H-piece 150, showing that H-piece 150 includes two axial portions, 152 and 154, that are the legs of the H, and a radial portion 156 that is the crosspiece of the H. Axial portion 152 is tapered, and H-pieces 150 are assembled with axial portions 152 adjacent to each other, radially inward with respect to stator axis 74, and parallel to stator axis 74, as shown in FIG. 8, so that axial portions 152 constitute hub 110, with each axial portion 152 constituting a 60° segment of hub 110. Radially outward axial portions 154, also being parallel to stator axis 74, then serve as crossbars 54, while radial portions 156 serve as stator cores 52.

H-pieces 150 are constructed in a maimer that suppresses eddy currents. FIG. 9 shows one such construction: a laminate of magnetically interactive sheets 158 and an electrically insulating material 160. The two azimuthally outward magnetically interactive sheets 158 are bent azimuthally inward in axial portion 152 to provide the taper of axial portion 152. As in the case of shaft 62, magnetically interactive sheets 158 preferably are made of magnetic steel and insulating material 160 preferably is epoxy glue that holds sheets 158 together.

Figure 10:
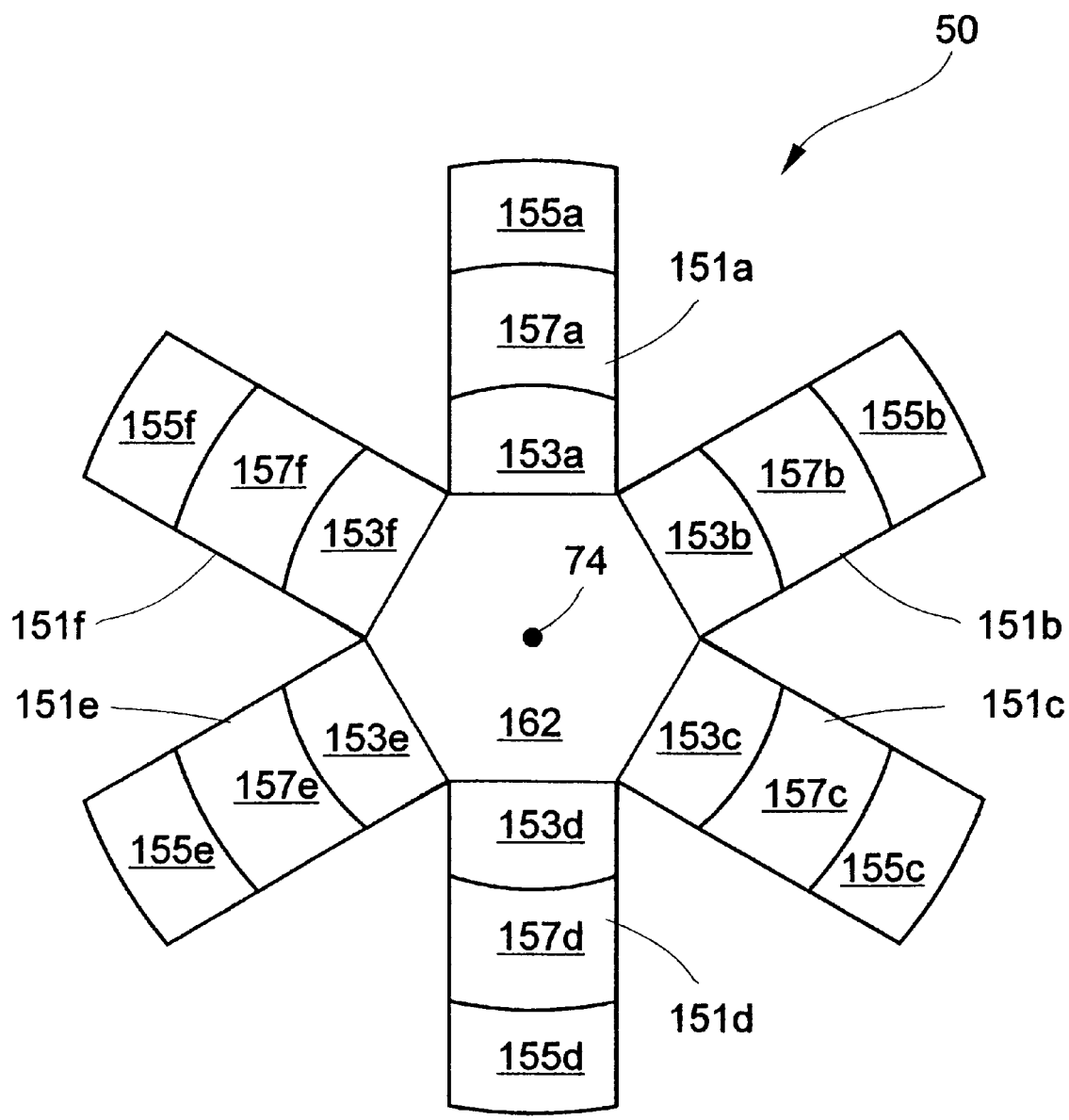
FIG. 10 is an end view of another preferred embodiment of the stator armature of the electrical machine of FIG. 7.

FIG. 10 is an end view of another preferred embodiment of stator armature 50 of the electrical machine of FIG. 7. Stator armature 50 of FIG. 10 is made of six H-pieces 151 which are similar to H-pieces 150 of FIGS. 8 and 9, each H-piece 151 including two axial portions 153 and 155 connected by a radial portion 157, with the difference that axial portions 153 of H-pieces 151 are not tapered. Instead, axial portions 153 define a cylindrical space 162, of hexagonal cross-section, through which shaft 122 runs. Stator axis 74 is the axis of symmetry of the hexagonal cylinder 162.

While the invention has been described with respect to a limited number of embodiments, it will be appreciated that many variations, modifications and other applications of the invention may be made.

What is claimed is:

1. An electrical machine comprising:
   (a) a rotor, free to rotate about a rotor axis and including:
      (i) a first magnetically interactive projection extending radially outward from said rotor axis, and
      (ii) a second magnetically interactive projection extending radially outward from said rotor axis; and
   (b) a stator including:
      (i) a first plurality of magnetically interactive stator cores extending radially outward from a first common center located on said rotor axis,
      (ii) a second plurality of magnetically interactive stator cores, like in number to said stator cores of said first plurality and extending radially outward from a second common center located on said rotor axis and different from said first common center,
      said common centers defining a stator axis coincident with said rotor axis, said stator cores of said first plurality being positioned azimuth ally around said stator axis at substantially equal angular separations, said stator cores of said second plurality being positioned azimuthally around said stator axis at substantially equal angular separations, said stator cores of said second plurality being displaced azimuthally with respect to said stator cores of said first plurality,
      (iii) a structure for magnetically linking said first projection of said rotor to a radially outward end of each of said stator cores as said first projection sweeps past each said stator core as said rotor rotates, said structure including, for each said stator core, a magnetically interactive crossbar, substantially parallel to said rotor axis, rigidly attached to said radially outward end of said each stator core, and having first and second radially inward surfaces, said first projection of said rotor sweeping past said first radially inward surfaces as said rotor rotates, and said second projection of said rotor sweeping past said second radially inward surface as said rotor rotates, and
      (iv) a magnetically interactive hub, radially inward from said stator cores, said stator cores being riaidly attached to, and projecting radially outward from, said hub;
      and wherein said stator includes a plurality of H-pieces, each said H-piece including a radially inward axial portion, a radial outward axial portion, and a radial portion joining said axial portions, with said radially inward axial portion being a segment of said hub, said radial portion being one of said stator cores, and said radially outward axial portion being said crossbar that is rigidly attached to said radially outward end of said one stator core.

2. The electrical machine of claim 1, wherein said stator cores are axially between said first and second projections of said rotor.

3. The electrical machine of claim 1, wherein said rotor includes a magnetically interactive shaft connecting said projections.

4. The electrical machine of claim 3, wherein said shaft is substantially coaxial with said rotor axis.

5. The electrical machine of claim 4, wherein said shaft is constructed so as to suppress eddy currents.

6. The electrical machine of claim 5, wherein said construction includes a plurality of radial grooves that span said shaft axially.

7. The electrical machine of claim 5, wherein said construction includes a plurality of sheets of a magnetically active material, said sheets extending radially outward from said rotor axis, said sheets being separated by at least one insulator.

8. The electrical machine of claim 1, wherein said hub includes a radially outward surface, said projections of said rotor sweeping past said radially outward surface as said rotor rotates.

9. The electrical machine of claim 1, further comprising:
   (c) a mechanism for generating a magnetic field in said rotor.

10. The elect rical machine of claim 9, wherein said mechanism includes at least one substantially toroidal axial winding concentric with said rotor axis.

11. The electrical machine of claim 1, wherein said stator further includes:
   (v) for each of said stator cores, a stator winding wound toroidally around said each stator core.

12. An electrical machine comprising:
   (a) a rotor, free to rotate about a rotor axis and including:
      (i) a first magnetically interactive projection extending radially outward from said rotor axis,
      (ii) a second magnetically interactive projection extending radially outward from said rotor axis, and
      (iii) a magnetically interactive shaft, substantially coaxial with said rotor axis, connecting said projections, and including a plurality of radial grooves that span said shaft axially, so as to suppress eddy currents; and
   (b) a stator including:
      (i) a first plurality of magnetically interactive stator cores extending radially outward from a first common center located on said rotor axis, and
      (ii) a structure for magnetically linking said first projection of said rotor to a radially outward end of each of said stator cores as said first projection sweeps past each said stator core as said rotor rotates, said structure including, for each said stator core, a magnetically interactive crossbar, substantially parallel to said rotor axis, rigidly attached to said radially outward end of said each stator core, and having first and second radially inward surfaces, said first projection of said rotor sweeping past said first radially inward surfaces as said rotor rotates, and said second projection of said rotor sweeping past said second radially inward surface as said rotor rotates.

13. An electrical machine comprising:
   (a) a rotor, free to rotate about a rotor axis and including:
      (i) a first magnetically interactive projection extending radially outward from said rotor axis,
      (ii) a second magnetically interactive projection extending radially outward from said rotor axis, and
      (iii) a magnetically interactive shaft, substantially coaxial with said rotor axis, connecting said projections, and including a plurality of sheets of a magnetically active material, said sheets extending radially outward from said rotor axis, said sheets being separated by at least one insulator; and
   (b) a stator including:
      (i) a first plurality of magnetically interactive stator cores extending radially outward from a first common center located on said rotor axis, and
      (ii) a structure for magnetically linking said first projection of said rotor to a radially outward end of each of said stator cores as said first projection sweeps past each said stator core as said rotor rotates, said structure including, for each said stator core, a magnetically interactive crossbar, substantially parallel to said rotor axis, rigidly attached to said radially outward end of said each stator core, and having first and second radially inward surfaces, said first projection of said rotor sweeping past said first radially inward surfaces as said rotor rotates, and said second projection of said rotor sweeping past said second radially inward surface as said rotor rotates.

* * * * *